R. E. HELLMUND.
CONTROL SYSTEM.
APPLICATION FILED JAN. 5, 1918.
1,311,514.
Patented July 29, 1919.
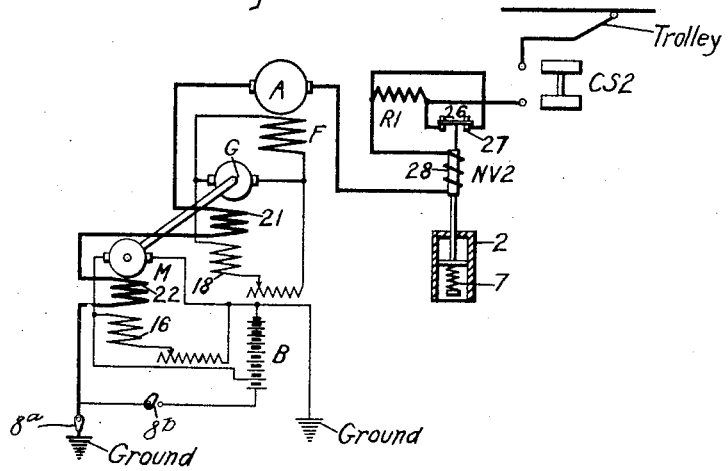
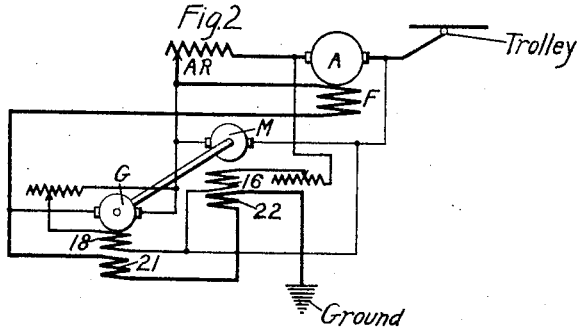
WITNESSES:
INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,311,514.  Specification of Letters Patent.  Patented July 29, 1919.

Original application filed September 25, 1914, Serial No. 863,504. Divided and application filed November 7, 1917, Serial No. 200,654. Divided and this application filed January 5, 1918. Serial No. 210,526.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application Serial No. 200,654, filed November 7, 1917, which is a division of application Serial No. 863,504, filed September 25, 1914.

My invention relates to systems of control, and it has special reference to means for preventing the occurrence of "flash-over" conditions in dynamo-electric machines, more particularly electric railway motors, under predetermined conditions.

One object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deënergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide means for obviating the above-mentioned operating difficulties by energizing the main field winding from some auxiliary source of energy when the supply-circuit energy is temporarily interrupted. The main field flux is thus maintained at a predetermined value during the interruption and, as a result, when the supply-circuit energy is resumed, the predominance of armature ampere-turns over field ampere-turns is prevented, and "flash-over" conditions do not obtain.

In the accompanying drawing, Figure 1 is a diagrammatic view of a control system embodying my invention, and Fig. 2 is a similar view of a modification of the invention.

Referring to Fig. 1 of the drawing, the system shown comprises a supply-circuit conductor marked "Trolley", a return circuit conductor marked "Ground", an electric motor having an armature A and a field magnet winding F of the series type; and a motor-generator set having a motor M that is driven from a variable battery B and is provided with a variable shunt field winding 16, and a generator G that is provided with a variable shunt field winding 18 and a series field winding 21 which is connected in circuit with the main armature A, the generator G being connected to energize the main field winding F.

Fig. 1 further discloses a series-type field winding 22 of the auxiliary motor M that is adapted to act differentially with respect to the shunt field winding 16. The field windings 21 and 22 are included in series circuit relation with the main armature A. The armature A is further connected to the supply circuit through a portion of a control switch CS2 and a resistor R1, which is paralleled by the coöperating stationary and movable contact members 26 and 27, respectively, of a suitable no-voltage graduated release switch NV2. The series-connected actuating coil 28 of the switch, when energized through the control switch CS2, is adapted to maintain contact between the contact members 26 and 27, which contact is not broken until a spring member 7 within the dash-pot 2 separates these contact members a predetermined period of time after the interruption of supply-circuit energy.

The system just described, while not suitable for maintaining the main field energization during relatively long energy interruptions, will however, produce a relatively steep main-motor speed characteristic, which is usually very desirable. This steep characteristic is obtained by reason of the fact that, whenever the armature current increases, the field-winding voltage and, therefore, the field current is increased, because of the increased excitation of the generator series field winding 21, as well as the increased speed of the motor-generator set that is caused by the field-weakening action of the differentially-connected motor field windings 22 and 16.

The function of the resistor R1 and switch NV2 is to act as a protective device in case of the above-mentioned relatively long energy interruptions. Upon the deënergization of the actuating coil 28 of the switch, the spring 7 gradually raises the movable contact member 27, until the contact members 26 and 27 separate after a predetermined period of time. If supply circuit energy is then resumed, the interposition of the resistor R1 in circuit will prevent an excessive instantaneous flow of current, if the control switch CS2 still occupies an operative position. The switch NV2 will then be closed by the energization of its actuating coil 28. If desired, the battery may be charged from the main motor circuit, by opening the switch 8$^a$ and closing the switch 8$^b$.

Fig. 2 discloses a system comprising a suitable supply circuit including conductors respectively marked Trolley and Ground; the main motor having the armature A and the field magnet winding F; an accelerating resistor AR; and an auxiliary motor-generator set comprising a motor M, and a generator G that is adapted to energize the main field winding F. The purpose of this system is to effect the previously-mentioned desired results under emergency conditions, without requiring the use of a battery or other auxiliary source of energy for the small motor, the armature thereof being connected across the main armature A and the accelerating resistor AR, whereby the motor-generator set may be temporarily driven by the main machine acting as a generator upon an interruption of supply-circuit voltage.

The motor M is also provided with a shunt field winding 16 which is adapted to be variably energized from the main armature A, and with a second field winding 22 that is connected in the main motor circuit. The generator G has a variable shunt field winding 18 that is connected across the terminals of the armature of the small motor M, and a second field winding 21 that is disposed in the main motor circuit.

The prevention of "flash-over" conditions in the system just described, upon the resumption of supply-circuit energy after a temporary interruption thereof, is effected as follows: The deënergization of the generator field winding 21 tends to decrease the excitation of the main field winding F, and, consequently, to decrease the voltage of the main armature A. However, the simultaneous deënergization of the auxiliary motor field winding 22 causes a corresponding increase in the speed of the motor-generator set, thereby tending to maintain a predetermined energization of the main field winding F.

I do not wish to be restricted to the specific circuit connections or arrangement of parts herein set forth, as various further modifications may be made within the spirit and scope of my invention. I desire, therefore, that only such limitations shall be imposed as are indicated in the appended claims.

I claim as my invention:

1. In a system of control, the combination with a supply circuit, and a main dynamo-electric machine having an armature and a field winding, of an auxiliary machine for exciting said field winding, a driving motor for said auxiliary machine, and means for maintainng the operation of said auxiliary machine in the event of relatively short interruptions of supply-circuit energy, said auxiliary machine and said driving motor both having field windings connected in series relation with the main machine.

2. In a system of control, the combination with a supply circuit and a dynamo-electric machine having an armature and a field winding, of an auxiliary machine for exciting said field winding, driving means energized from the main machine in the event of relatively short interruptions of supply-circuit energy for maintaining the operation of said auxiliary machine, and means for automatically changing certain circuit connections to afford greater protection to the motor in the event of longer interruptions.

3. In a system of control, the combination with a supply circuit and a main dynamo-electric machine having an armature and a field winding, of an auxiliary machine for exciting said field winding, an auxiliary motor energized independently of said supply circuit for maintaining the operation of said auxiliary machine in the event of supply-circuit energy interruptions of relatively short duration, and relay means for automatically interrupting direct connection of the main machine to the supply circuit in the event of longer interruptions.

4. In a system of control, the combination with a supply circuit and a main dynamo-electric machine having an armature and a field winding, of an auxiliary machine for exciting said field winding and provided with a field winding connected in series relation with the main armature, a driving motor for said auxiliary machine and also provided with a field winding connected in series relation with the main armature, an independent source of energy for said driving motor for maintaining the operation of said auxiliary machine in the event of supply-circuit energy interruptions of relatively short duration, and relay means for automatically interrupting direct connection of the main machine to the supply circuit in the event of longer interruptions.

5. In a system of control, the combination with a supply circuit and a main dynamo-electric machine having an armature and a field winding, of an auxiliary machine for exciting said field winding, an auxiliary motor energized independently of said supply circuit for maintaining the operation of said auxiliary machine in the event of supply-circuit energy interruptions of relatively short duration, a translating device, and relay means for automatically inserting said device in circuit with the main machine in the event of longer interruptions.

6. In a system of control, the combination with a supply circuit and a main dynamo-electric machine having an armature and a field winding, of an auxiliary machine for exciting said field winding and provided with a field winding connected in series relation with the main armature, a driving motor for said auxiliary machine and also provided with a field winding connected in series relation with the main armature, a storage battery for energizing said driving motor to maintain the operation of said auxiliary machine in the event of supply-circuit energy interruptions of relatively short duration, a translating device, and relay means controlled by the main-machine current for automatically inserting said device in circuit with the main machine in the event of longer interruptions.

In testimony whereof, I have hereunto subscribed my name this 22nd day of Dec., 1917.

RUDOLF E. HELLMUND.

Copies of this patent may be obtained for five cents each, by addressing the "Commissioner of Patents Washington, D. C."